March 22, 1927.

L. CORSI 1,621,525

HEAVY OIL INTERNAL COMBUSTION ENGINE

Filed Dec. 26, 1924    3 Sheets-Sheet 1

Inventor,
Luigi Corsi

Patented Mar. 22, 1927.

1,621,525

UNITED STATES PATENT OFFICE.

LUIGI CORSI, OF TURIN, ITALY.

HEAVY-OIL INTERNAL-COMBUSTION ENGINE.

Application filed December 26, 1924, Serial No. 758,243, and in Italy December 27, 1923.

My invention has for its object improvements in internal combustion engines employing heavy oils of the type in which the pulverized mixture of naphtha and air is vaporized by passing along the walls of casings or the like, which are in contact with the combustion gases in the engine head, before being introduced into the driving cylinder. The object of my invention is more particularly characterized by the construction of the superheater, whereby the highest efficiency of the apparatus and a feeding of the engine without an excessive resistance to the suction are obtained.

The annexed drawings show several constructional forms adapted to different conditions of work.

Figure 1:
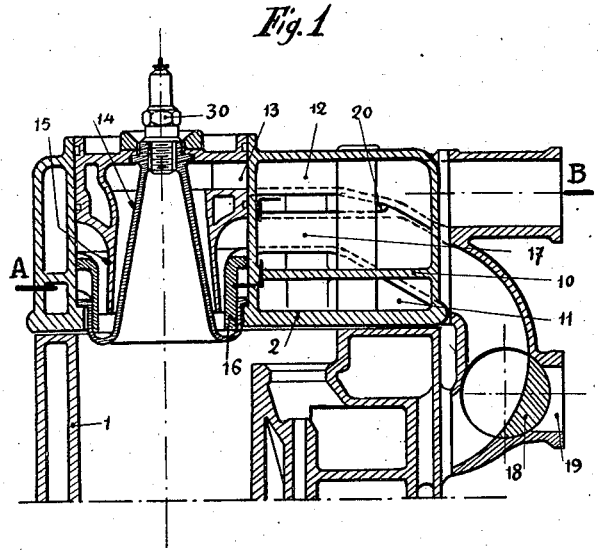
Fig. 1 shows in cross section a cylinder having its head secured thereto, the illustrated form of the casing being very convenient for facilitating the combustion and superheating.

According to the constructional form illustrated in Fig. 1, 1 is the body of a cylinder group of usual type and 2 the engine head, which in the illustrated example is detachable, but may also be in a single piece with the cylinder group. Said head is divided into two superposed compartments separated by a partition 10.

In the lower compartment 11 the cooling water circulates and in the upper compartment 20 are contained the pipes leading from the carburetter (not shewn) to the superheaters and from these latter to the suction valve.

The inlet tube 12 opens in a cylindrical recess 13, in which is arranged a casing 14 in the form of a truncated cone having its tapering end turned upwards, where the spark plug 30 is screwed.

In the recess 13 and surrounding the casing 14 is arranged a tubular piece 15 forming an annular chamber communicating at its upper part with the tube 12, from which the mixture formed in the carburetter (not shewn) is discharged.

Figure 2:
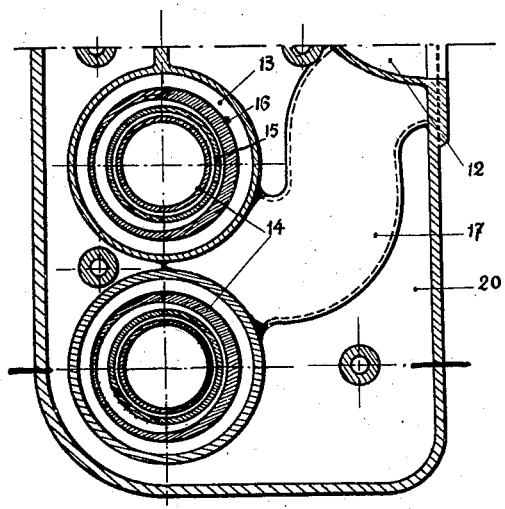
Fig. 2 is a horizontal section on line A—B of Fig. 1.

The piece 15 is surrounded by a bush 16 which is eccentric with respect to the tubular piece 15, as shown in Fig. 2 and serves to produce in the annular conduit a throttling point that may be displaced around the casing, in order to control the resistance to the flow of the gases at different points, thus avoiding a direct passage of the gases from the inlet tube 12 to the tube 17 leading to the suction valve.

The tube 17 is provided with a two way valve 18 permitting connection with the suction valves either a heavy oil carburetter (not shewn) and superheater or a petrol starting carburetter (not shewn) applied to the orifice 19.

The arrangement of the sparking plug at the higher point of the casing 14 allows an immediate ignition of the mixture, the shape of the casing facilitating the propagation of the explosion.

The tubes 12 and 17, as appear from the drawing, are contained in an air chamber 20, thus preventing a too active interchange of heat between said tubes and the outside, which might produce a partial condensation of the already vaporized mixture.

Said tubes may be arranged in different ways according to the direction of the gas flow through the heating chambers before reaching the engine suction valves.

In the example shewn in Fig. 2, the inlet and discharge tubes are nearly equal and superposed. They are divided into two branches immediately after admission in the chamber 20 and said branches are in their turn subdivided each into two branches, each of which leads to a group of two casings. The mixture admitted into the space surrounding the casing 14 passes along this latter, then rises between pipe 15 and bush 16 and enters the tube 17.

In the case of engines where it is of great importance to fill up as fully as possible the cylinders and more particularly in the case of high speed engines subjected to strong load and speed variations, the above described arrangement would still show an insufficient pneumatic efficiency. Said inconvenience may be removed by eliminating the pipe 15, but as in this case the gases would remain during a too short time in contact with the casings, it will be necessary to cause the gases to pass in succession from one casing to another thus becoming heated by degrees.

Figure 3:
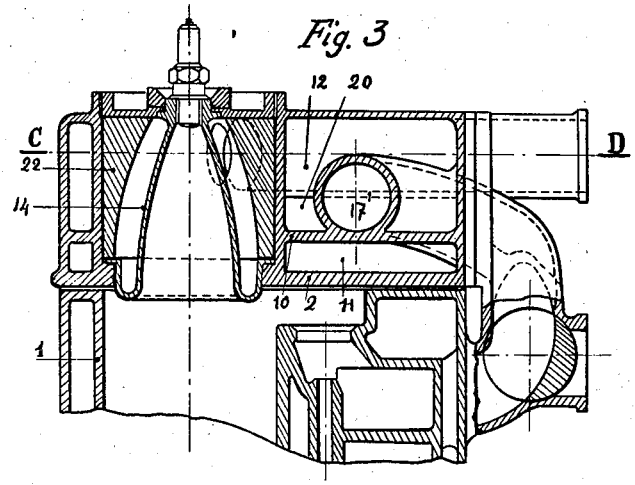
Fig. 3 shows a modified form of Fig. 1.
Figure 4:
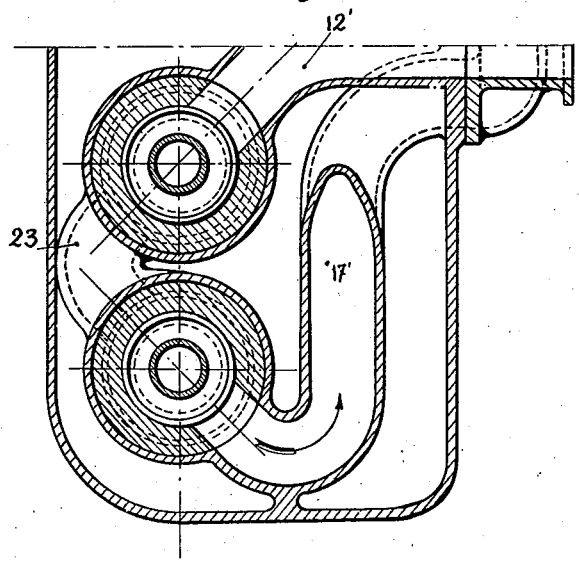
Fig. 4 is a section on line C—D of Fig. 3.
Figure 5:
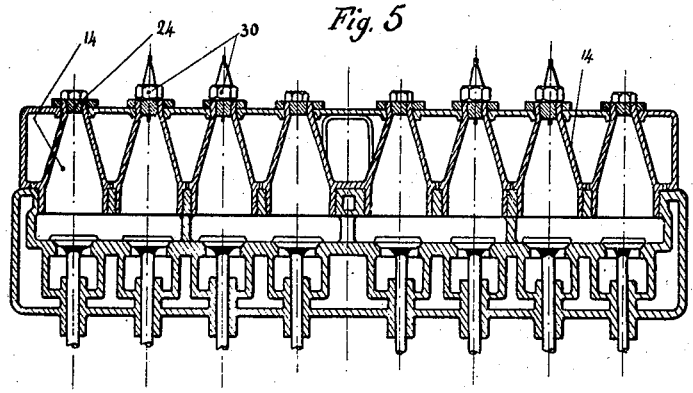
Figs. 5 and 6 show a further modified form, in which the casings are mounted in the openings, provided in the cover for the passage of the valves when the latter are mounted or removed, instead of the plugs that usually close said openings.
Figure 6:
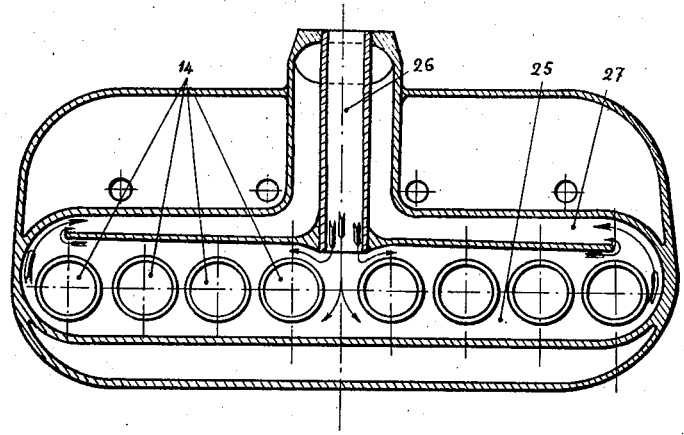

The constructional form shewn in Figs. 3 and 4 would satisfy the above requirements. The casing 14 is surrounded by a lining 22 of refractory material, preventing the dispersion of heat and facilitating at the same time the discharge of the gases.

According to said arrangement, the gases are admitted into the first casing and discharged below through the tube 23, they then flow into the second casing which is heated thereby. Leaving said second casing at its upper part, the gases reach the discharge tube 17' conveying them to the suction valve.

Instead of only two casings arranged in series a greater number can of course be used taking care that the casings that are finally traversed by the gases do not become excessively heated.

When this arrangement is to be applied to engines already constructed, the casings are mounted in the openings provided in the covers, for the passage of the valves when the latter are mounted or removed, instead of the plugs that usually close said openings. They will of course be of reduced size and in number of two for each cylinder. One of them will carry the sparking plug while the other will be closed by a plug 24 and provided with a second sparking plug in the case of double ignition engines. All casings are enclosed in a rectangular conduit 25, in which the mixture is admitted at the center thereof through a conduit 26 and after having passed the casings 14 issues at the ends of conduit 25 through the conduits 27 conveying it to the suction valve.

When all the plugs are to work in series, the conduit 26 is eliminated and one of the branches of the conduit 27 would effect the admission and the other the discharge of the gases.

Figure 7:
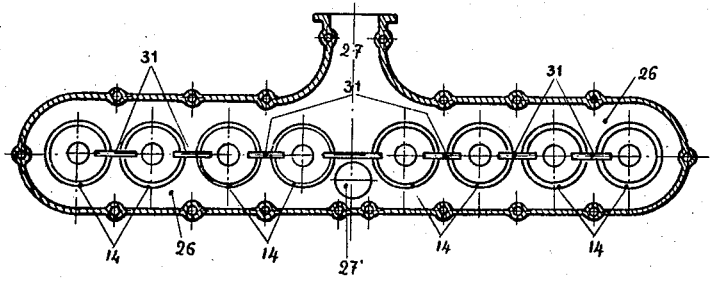
Fig. 7 shows a further modified form, in which the casings are so arranged that an equal temperature is assured in them.

This simpler arrangement is however less convenient owing to the difference of temperature between the first and last casing, unless the constructional form shown in Fig. 7 is adopted.

In this case the casings are separated by partitions 31, so that the chamber 26 is divided into two parallel conduits that are successively traversed by the gases; these latter may be admitted, as in the example shown, through an opening 27, placed half way in the chamber 26 and will be subdivided and flow through the conduits passing first along one half and then along the other half of the casing, issuing finally through the orifice 27', or the admission and discharge conduits may be placed side by side so that the gases will flow through the entire length of the conduit 26 without being divided.

In both cases, the casing that will be traversed along on one side by the cold gases will be traversed on the other side by the thoroughly heated gases and the successive casings that are passed along on one side by the gases more and more heated, will be traversed on the other side by the gases less heated, so that the heat difference between each casing and the average temperature of the gases by which it is traversed will be practically uniform, so that also the quantity of given out heat and the working temperature of each casing will be equal.

What I claim is:

1. In an internal combustion heavy oil engine, the combination with a cylinder, and a suction valve therein, of a hollow head on the cylinder having a tubular conduit corresponding to the cylinder, a partition subdividing the head into an upper and a lower compartment, the lower compartment forming a cooling jacket for the head, a bell-shaped casing within the tubular conduit and communicating with the cylinder through its enlarged end, a spark plug at the vertex of said casing, an annular chamber between the casing and tubular conduit, a conduit extending through said upper compartment and connecting the annular chamber with the suction valve, and a second conduit extending through the upper compartment for conveying vaporized fuel from a carburetter to the annular chamber.

2. In an internal combustion engine employing heavy oils, the combination with a cylinder, a suction valve therein, and a hollow cylinder head having a tubular conduit passing through the same, of a bell-shaped casing in the tubular conduit and communicating with the cylinder through its enlarged end, an annular chamber between the casing and the tubular conduit, a tubular member projecting downwardly into the annular chamber and having a lateral opening in its upper end, a rotatable bush mounted eccentrically in the annular chamber and surrounding the lower end of the tubular member to control the resistance to the flow of the gases, a conduit in the cylinder head connecting the annular chamber with the suction valve, and a conduit for connecting the interior of the tubular member with a carburetter.

3. In an internal combustion engine employing heavy oils, the combination with a cylinder, a suction valve therein, and a hollow head on the cylinder, of a bell-shaped casing located in the head and communicating with the cylinder, through its enlarged end, an annular chamber surrounding the casing, a conduit in the cylinder head connecting the suction valve with the annular chamber, a second conduit for connecting the latter with a carburetter, and a two-way valve in the first named conduit, whereby the suction valve may be placed in direct communication with a carburetter.

4. An internal combustion engine employing heavy oils, comprising a plurality of cylinders, a suction valve in each cylinder, a head for the cylinders having openings opposite each cylinder, bell-shaped casings located in the openings and communicating with the cylinders through their enlarged ends, annular chambers between said casings and the side walls of the cylinder head, conduits connecting groups of said annular chambers together in series, a collecting conduit to which each unit is connected in parallel on one side to a carburetter, a collecting conduit on the other side connecting each unit with a suction valve, and an air filled compartment in which said conduits are arranged.

In testimony that I claim the foregoing as my invention, I have signed my name.

LUIGI CORSI.